(12) United States Patent
Gorkovenko

(10) Patent No.: US 7,316,868 B2
(45) Date of Patent: Jan. 8, 2008

(54) ELECTROLYTES FOR LITHIUM-SULFUR ELECTROCHEMICAL CELLS

(75) Inventor: Alexander Gorkovenko, Mission Veijo, CA (US)

(73) Assignee: Sion Power Corporation, Tucson, AZ (US)

( * ) Notice: Subject to any disclaimer, the term of this patent is extended or adjusted under 35 U.S.C. 154(b) by 623 days.

(21) Appl. No.: 10/779,102

(22) Filed: Feb. 11, 2004

(65) Prior Publication Data

US 2005/0175904 A1 Aug. 11, 2005

(51) Int. Cl.
H01M 6/16 (2006.01)

(52) U.S. Cl. .............. 429/329; 429/324; 429/326; 429/218.1

(58) Field of Classification Search .......... 429/324, 429/326, 333, 335, 231.9, 329, 218.1; 252/62.2
See application file for complete search history.

(56) References Cited

U.S. PATENT DOCUMENTS

| | | | |
|---|---|---|---|
| 3,877,983 A | 4/1975 | Hovsepian | |
| 4,084,045 A | 4/1978 | Kegelman | |
| 4,086,403 A | 4/1978 | Whittingham et al. | |
| 4,804,595 A | 2/1989 | Bakos et al. | |
| 5,272,022 A | 12/1993 | Takami et al. | |
| 5,529,860 A | 6/1996 | Skotheim et al. | |
| 5,601,947 A | 2/1997 | Skotheim et al. | |
| 5,686,201 A | 11/1997 | Chu | |
| 5,690,702 A | 11/1997 | Skotheim et al. | |
| 5,856,039 A | 1/1999 | Takahashi | |
| 5,919,587 A | 7/1999 | Mukherjee et al. | |
| 5,935,724 A | 8/1999 | Spillman et al. | |
| 5,935,728 A | 8/1999 | Spillman et al. | |
| 6,019,908 A | 2/2000 | Kono et al. | |
| 6,030,720 A | 2/2000 | Chu et al. | |
| 6,051,343 A | 4/2000 | Suzuki et al. | |
| 6,110,619 A | 8/2000 | Zhang et al. | |
| 6,117,590 A | 9/2000 | Skotheim et al. | |
| 6,153,337 A | 11/2000 | Carlson et al. | |
| 6,190,426 B1 | 2/2001 | Thibault et al. | |
| 6,194,099 B1 | 2/2001 | Geronov et al. | |
| 6,201,100 B1 | 3/2001 | Gorkovenko et al. | |
| 6,210,831 B1 | 4/2001 | Gorkovenko et al. | |
| 6,218,054 B1 | 4/2001 | Webber | |
| 6,225,002 B1 | 5/2001 | Nimon et al. | |
| 6,296,967 B1 | 10/2001 | Jacobs et al. | |
| 6,344,293 B1 | 2/2002 | Geronov | |
| 6,406,815 B1 | 6/2002 | Sandberg et al. | |
| 6,544,688 B1 | 4/2003 | Cheng | |

FOREIGN PATENT DOCUMENTS

| | | |
|---|---|---|
| EP | 0 924 789 A1 | 6/1999 |
| EP | 1 406 339 A1 | 4/2004 |
| WO | WO 00/46870 * | 8/2000 |

OTHER PUBLICATIONS

Koji Nishio et al., "Discharge Characteristics of Manganese Dioxide/Lithium Cells in Various Electrolyte Solutions" Journal of Power Sources, vol. 55, pp. 115-117 (1995).
Duck-Rye Chang et al., Binary Electrolyte Based on Tetra (Ethylene Glycol) Dimethyl Ether and 1,3-Dioxolane for Lithium-Sulfur Battery, vol. 112, pp. 452-460 (2002).
Peled et al., "The Electrochemical Behavior of Alkali and Alkaline Earth Metals in Nonaqueous Battery Systems", J. Electrochem. Soc., vol. 126, pp. 2047-2051 (1979).
Peled et al., "Lithium-Sulfur Battery: Evaluation of Dioxolane-Based Electrolytes", J. Electrochem. Soc., vol. 136, pp. 1621-1625 (1989).
Dominey, "Current State of the Art on Lithium Battery Electrolytes", Industrial Chemistry Library, vol. 5, Lithium Batteries: New Materials, Developments and Perspectives, Chapter 4, pp. 137-165, Elsevier, Amsterdam, 1994.
Handbook of Batteries, Linden, 2nd edition, chapter 14, pp. 75-76, McGraw-Hill, New York (1995).
Handbook of Batteries, Linden, 2nd edition, chapter 36, p. 2, McGraw-Hill, New York (1995).
Nishio et al., "Discharge Characteristics of Manganese Dioxide/Lithium Cells in Various Electrolyte Solutions", J. Power Sources, vol. 55, pp. 115-117 (1995).
Aurbach in Nonaqueous Electrochemistry, Chapter 6, pp. 289-366, Marcel Dekker, New York, 1999.

* cited by examiner

Primary Examiner—Raymond Alejandro
(74) Attorney, Agent, or Firm—David E. Rogers; Jacqueline M. Nicol; Squire, Sanders & Dempsey LLP

(57) ABSTRACT

Disclosed is an electrolyte for an electrochemical cell wherein the electrolyte includes a solvent mixture comprising a dioxolane and one or more of 1,2-dialkoxyalkanes of 5 or 6 carbon atoms and/or 1,3-dialkoxyalkanes of 5 or 6 carbon atoms. Also disclosed are cells and batteries including the electrolyte. An electrochemical cell including the electrolyte preferably has an anode that includes lithium and a cathode including an electroactive sulfur-containing material.

30 Claims, No Drawings

ELECTROLYTES FOR LITHIUM-SULFUR ELECTROCHEMICAL CELLS

TECHNICAL FIELD

The present invention relates to the field of electrochemical cells comprising nonaqueous electrolytes. More specifically, the present invention pertains to electrochemical cells comprising: (a) an anode comprising lithium; (b) a cathode comprising an electroactive sulfur-containing material; and (c) a liquid nonaqueous electrolyte, wherein the electrolyte comprises a solvent mixture comprising a dioxolane and one or more 1,2-dialkoxyalkanes or 1,3-dialkoxyalkanes.

BACKGROUND

There has been considerable interest in recent years in developing high energy density batteries with lithium-containing anodes. Lithium metal is particularly attractive as the anode active material of electrochemical cells because of its light weight and high energy density, as compared, for example, to anode active materials such as lithium intercalated carbon anodes, where the presence of non-electroactive materials increases the weight and volume of the anode, thereby reducing the energy density of the anode. The use of lithium metal anodes, or those comprising lithium metal, provides an opportunity to construct cells that are lighter in weight and have a higher energy density than cells such as lithium-ion, nickel metal hydride or nickel-cadmium cells. These features are highly desirable for batteries in portable electronic devices such as cellular telephones and laptop computers, as noted, for example, by Linden in *Handbook of Batteries*, 1995, 2$^{nd}$ Edition, chapter 14, pp. 75-76, and chapter 36, p.2, McGraw-Hill, New York, and in U.S. Pat. No. 6,406,815 to Sandberg et al., the respective disclosures of which are incorporated herein by reference.

Thin film battery design is particularly suitable for portable electronic devices because their light weight combined with high surface area electrodes allows high rate capability, as well as reduced current density on charging and/or shorter charge time. High rate means the battery is capable on discharging its complete capacity in 20 minutes (3C rate) or less (>3C rate). Several types of cathode materials for thin-film lithium batteries are known, and include sulfur-containing cathode materials comprising sulfur-sulfur bonds, wherein high energy capacity and rechargeability are achieved from the electrochemical cleavage (via reduction) and reformation (via oxidation) of sulfur-sulfur bonds. Examples of sulfur containing cathode materials for use in electrochemical cells having lithium or sodium anodes include elemental sulfur, organo-sulfur, or carbon-sulfur compositions.

Lithium anodes in nonaqueous electrochemical cells develop surface films from reaction with cell components including nonaqueous solvents of the electrolyte system and materials dissolved in the solvents, such as, for example, electrolyte salts and materials that enter the electrolyte from the cathode. Materials entering the electrolyte from the cathode may include components of the cathode formulations and reduction products of the cathode formed upon cell discharge. In electrochemical cells with cathodes comprising sulfur-containing materials reduction products may include sulfides and polysulfides. The composition and properties of surface films on lithium electrodes have been extensively studied, and some of these studies have been summarized by Aurbach in *Nonaqueous Electrochemistry*, Chapter 6, pages 289-366, Marcel Dekker, New York, 1999. The surface films have been termed solid electrolyte interface (SEI) by Peled, in *J. Electrochem. Soc.*, 1979, vol. 126, pages 2047-2051.

Among the examples of nonaqueous electrolyte solvents for lithium batteries described by Dominey in *Lithium Batteries, New Materials, Developments and Perspectives*, Chapter 4, pp. 137-165, Elsevier, Amsterdam (1994) are dioxolanes and glymes. Members of the glyme family, including dimethoxyethane (DME), diglyme (diethylene glycol dimethyl ether), triglyme (triethylene glycol dimethyl ether), ethylene glycol diethyl ether (DEE), and diethylene glycol diethyl ether, are often listed as being suitable electrolyte solvents, for example in U.S. Pat. No. 6,051,343 to Suzuki et al., U.S. Pat. No. 6,019,908 to Kono et al., and U.S. Pat. No. 5,856,039 to Takahashi. Electrolyte solvents comprising dioxolane and glymes have been described for use in nonaqueous electrochemical cells with a variety of anodes and cathodes. For example, in U.S. Pat. Nos. 4,084,045 to Kegelman, 4,086,403 to Whittingham et al., 3,877,983 to Hovsepian, and 6,218,054 to Webber, dioxolane and dimethoxyethane (DME) comprise the electrolyte solvents. Nimon et al. in U.S. Pat. No. 6,225,002 describe battery cells with gel or solid state electrolytes which comprise glymes and less than 30% by volume of dioxolane.

For rechargeable lithium/sulfur (Li/S) cells there is a need for further enhancement of cell performance, for example through improvements in the electrolyte solvent system. Ideally cells should have high utilization at practical discharge rates over many cycles. Complete discharge of a cell over time periods ranging from 20 minutes (3C) to 3 hours (C/3) is typically considered a practical discharge rate. Cycle life is typically considered to be the number of cycles to the point when a cell is no longer able to maintain acceptable levels of charge capacity, such as 80% of the initial capacity of the battery.

As used herein, a "100% utilization" (also called "sulfur utilization") assumes that if all elemental sulfur in an electrode is fully utilized, the electrode will produce 1675 mAh per gram of sulfur initially present in the electrode. Among the prior art references that discuss and teach performance in Li/S cells, including parameters such as sulfur utilization, discharge rates, and cycle life are the following: (1) Peled et al., *J. Electrochem. Soc.*, 1989, vol. 136, pp. 1621-1625 which discloses that Li/S cells with dioxolane electrolyte solvent mixtures achieve a sulfur utilization of no more than 50% at discharge rates of 0.1 mA/cm$^2$ and 0.01 mA/cm$^2$; (2) U.S. Pat. No. 5,686,201 to Chu describes a Li/S cell with a polymeric electrolyte that delivers 54% utilization at 30° C. and a low discharge rate of 0.02 mA/cm$^2$. At 90° C. a utilization of 90% at a discharge rate of 0.1 mA/cm$^2$ was achieved; (3) U.S. Pat. No. 6,030,720 to Chu et al., which describes liquid electrolyte Li/S rechargeable cells with sulfur utilization of approximately 40% for more than 70 cycles at discharge rates of 0.09 mA/cm$^2$ (90 μA/cm$^2$) and 0.5 mA/cm$^2$ (500 μA/cm$^2$). Another example (Example 4) describes a sulfur utilization of 60% over more than 35 cycles but at the low discharge rate of 0.09 mA/cm$^2$; (4) U.S. Pat. No. 5,919,587 to Mukherjee et al., which describes liquid electrolyte Li/S rechargeable cells with sulfur utilization of approximately 36% for more than 60 cycles at discharge rates of 0.57 mA/cm$^2$; (5) U.S. Pat. No. 6,110,619 to Zhang et al., which describes liquid electrolyte Li/S rechargeable cells with sulfur utilization of approximately 38% for more than 100 cycles and 19% for more than 200 cycles at discharge rates of 0.33 mA/cm$^2$; (6) U.S. Pat. No. 6,544,688 to Cheng, which describes liquid electrolyte Li/S rechargeable cells with sulfur utilization of approximately 45% for more than 100 cycles at discharge rates of 0.42 mA/cm$^2$; and (7) U.S. Pat. No. 6,344,293 to Geronov, which describes liquid electrolyte Li/S rechargeable cells with sulfur utilization of approximately 21% for more than 275 cycles at discharge rates of 0.41 mA/cm$^2$.

Among the prior art references that discuss and teach the effect of different glycol ethers in electrolytes on the performance of lithium cells are the following: (1) Nishio et al., *J. Power Sources,* 1995, vol. 55, pp. 115-117, which discloses that discharge capacities of MnO$_2$/Li cells in electrolyte solvent mixtures of propylene carbonate (PC) with ethers DME, ethoxymethoxyethane (EME), or DEE (1:1 volume ratio) show declining capacity in the order DME/PC>EME/PC>DEE/PC; and (2) U.S. Pat. No. 5,272,022 to Takami et al., which discloses lithium ion batteries in which the electrolyte solvents include carbonates mixed with the glymes DME, DEE, and EME. The cycle life of cells with electrolyte solvent mixtures of DME with diethyl carbonate and propylene carbonate is greater than the cycle life obtained with EME and these carbonates. In summary, in these head-to-head comparisons DME containing electrolyte solvent mixtures outperform the equivalent EME containing solvent mixtures.

In U.S. Pat. No. 4,804,595 to Bakos et al. it is reported that 1,2-dimethoxypropane provides comparable performance to DME in electrolyte formulations with propylene carbonate in electrochemical cells with lithium anodes and MnO$_2$ or FeS$_5$ cathodes.

SUMMARY OF THE INVENTION

The present invention pertains to electrochemicals cell comprising: (a) an anode comprising lithium; (b) a cathode comprising an electroactive sulfur-containing material; and (c) a liquid nonaqueous electrolyte, wherein the electrolyte comprises: (i) one or more lithium salts; and (ii) a solvent mixture comprising 10 to 90% by weight of a dioxolane and 10 to 90% by weight of one or more 1,2-dialkoxyalkanes or 1,3-dialkoxyalkanes of 5 or 6 carbon atoms. The cells show high sulfur utilization over many discharge-charge cycles at practical rates of discharge and charge.

DETAILED DESCRIPTION OF THE INVENTION

One aspect of the present invention provides an electrochemical cell comprising: (a) an anode comprising lithium; (b) a cathode comprising an electroactive sulfur-containing material; and (c) a nonaqueous electrolyte; wherein the electrolyte comprises: (i) one or more lithium salts; and (ii) one or more 1,2-dialkoxyalkanes or 1,3-dialkoxyalkanes.

Liquid electrolyte lithium/sulfur cells typically comprise an anode comprising lithium, a cathode comprising an electroactive sulfur-containing material, a nonaqueous electrolyte, and a separator interposed between the anode and cathode, as described, for example, in U.S. Pat. No. 6,210,831 to Gorkovenko et al. and U.S. Pat. No. 5,919,587 to Mukherjee et al., the respective disclosures of which are incorporated herein by reference. Following are descriptions of the preferred anode, cathode, separator, and electrolyte, of an electrochemical cell according to the invention.

Anode

The anode may be of any structure suitable for use in a given electrochemical cell and with a given cathode. Suitable anode active materials, comprising lithium, for the anodes of the present invention include, but are not limited to, lithium metal, such as lithium foil and lithium deposited onto a substrate (such as a plastic film) and lithium alloys, such as lithium-aluminum alloys and lithium-tin alloys. Lithium anodes comprising multi-layer coatings such as those described in U.S. patent application Ser. Nos. 09/721,578 and 09/864,890 to Skotheim et al., the disclosures of which that describe lithium anodes is incorporated herein by reference, may also be used.

Cathode

The cathode of a cell according to the present invention comprises cathode active layers including an electroactive sulfur-containing material. The preferred cathode active layers are coated onto substrates, such as current collectors, to form composite cathodes, although any cathode structure that includes electroactive sulfur-containing material may be used. The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials include, but are not limited to, elemental sulfur and organic materials comprising both sulfur atoms and carbon atoms, which may or may not be polymeric. Suitable organic materials include those further comprising heteroatoms, conductive polymer segments, composites, and conductive polymers.

In one embodiment, the electroactive sulfur-containing material comprises elemental sulfur. In another embodiment, the electroactive sulfur-containing material comprises a mixture of elemental sulfur and a sulfur-containing polymer.

Suitable sulfur-containing organic polymers include, but are not limited to, those described in U.S. Pat. Nos. 5,601,947; 5,690,702; 5,529,860; and 6,117,590 to Skotheim et al.; and U.S. Pat. No. 6,201,100 to Gorkovenko et al., the respective disclosures of each being incorporated herein by reference.

The electroactive sulfur-containing cathodes of the present invention may further comprise electroactive metal chalcogenides, electroactive conductive polymers, and combinations thereof, for example, as described in U.S. Pat. No. 5,919,587 to Mukherjee et al. and U.S. Pat. No. 6,201,100 to Gorkovenko et al.

The cathode active layers may further comprise one or more conductive fillers to provide enhanced electronic conductivity, for example, as described in U.S. Pat. No. 6,194,099 to Geronov et al. and U.S. Pat. No. 6,210,831 to Gorkovenko et al. the respective disclosures of which are incorporated herein by reference The cathode active layers may also comprise a binder. The choice of binder material may vary depending upon the chemical composition of the cathode active layer. Useful binders are those materials, usually polymeric, that allow for ease of processing of the battery electrode composites and are known to those skilled in the art of electrode fabrication.

Separator

The electrochemical cells of the present invention may further comprise a separator interposed between the cathode and anode, although a separator is optional. Typically, the separator is a porous non-conductive or insulative material that separates or insulates the anode and the cathode from each other, and which permits the transport of ions through the separator between the anode and the cathode.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in U.S. Pat. No. 6,153,337, by Carlson et al., the disclosure of which related to the structure of separators and separator materials is incorporated herein by reference. Separators of a wide range of thickness may be used, for example from about 5 μm to about 50 μm, preferably from about 5 μm to about 25 μm.

Nonagueous Electrolyte

The electrolytes used in electrochemical cells function as a medium for the storage and transport of ions, and in the case of solid electrolytes and gel electrolytes, these materials may additionally function as separator materials between the anode and the cathode. Any liquid, solid, or gel material capable of storing and transporting ions may be used as an electrolyte in the invention, so long as the material is substantially electrochemically and chemically unreactive with respect to the anode and the cathode, and the material facilitates the transport of lithium ions between the anode and the cathode. The electrolyte must also be electrically non-conductive to prevent short circuiting between the anode and the cathode.

Typically, the electrolyte comprises one or more ionic electrolyte salts to provide ionic conductivity and one or more nonaqueous liquid electrolyte solvents, gel polymer materials, or solid polymer materials.

In one embodiment, the electrolyte comprises:

(a) one or more lithium salts; and (b) a solvent mixture comprising 10 to 90% by weight of a dioxolane and 10 to 90% by weight of one or more 1,2-dialkoxyalkanes of 5 or 6 carbon atoms and/or 1,3-dialkoxyalkanes of 5 or 6 carbon atoms.

Suitable 1,2-dialkoxyalkanes and 1,3-dialkoxyalkanes include, but are not limited to, 1-ethoxy-2-methoxyethane, 1,3-dimethoxypropane, 1,2-dimethoxypropane, 1-ethoxy-2-methoxypropane, 2-ethoxy-1-methoxypropane, 1-methoxy-2-propoxyethane, 1-methoxy-2-isopropoxyethane, 1,2-dimethoxybutane, 1,3-dimethoxybutane, and 2,3-dimethoxybutane.

Preferred 1,2-dialkoxyalkanes and 1,3-dialkoxyalkanes are 1-ethoxy-2-methoxyethane, 1-methoxy-2-propoxyethane, 1,2-dimethoxypropane, 1-ethoxy-2-methoxypropane, 2-ethoxy-1-methoxypropane, 1,3-dimethoxypropane, and 1,3-dimethoxybutane. More preferred 1,2-dialkoxyalkanes and 1,3-dialkoxyalkanes are 1-ethoxy-2-methoxyethane, 1,2-dimethoxypropane, and 1,3-dimethoxypropane. Most preferred is 1-ethoxy-2-methoxyethane.

Dioxolanes suitable for the electrolytes of the present invention include 1,3-dioxolane and alkyl substituted 1,3-dioxolanes such as 4-methyl-1,3-dioxolane, 4,5-dimethyl-1,3-dioxolane, and 2-methyl-1,3-dioxolane. Preferred dioxolanes are 4-methyl-1,3-dioxolane and 1,3-dioxolane. Most preferred is 1,3-dioxolane.

The electrolyte solvent mixture of the present invention may have a range of ratios of a dioxolane to one or more dialkoxyalkanes. In one embodiment, the electrolyte solvent mixture comprises from 10 to 90% by weight of a dioxolane and from 10 to 90% by weight of one or more 1,2-dialkoxyalkanes and/or 1,3-dialkoxyalkanes. In a preferred embodiment, the electrolyte solvent mixture comprises from 30 to 80% by weight of a dioxolane and from 20 to 70% by weight of one or more 1,2-dialkoxyalkanes and/or 1,3-dialkoxyalkanes. In a more preferred embodiment, the electrolyte solvent mixture comprises from 50 to 75% by weight of a dioxolane and from 25 to 50% by weight of one or more 1,2-dialkoxyalkanes and/or 1,3-dialkoxyalkanes.

The electrolyte solvent mixture may further comprise, in one embodiment of the present invention, an additive selected from one or more of the group consisting of furan, 2-methylfuran, 2,5-dimethylfuran, 2-methylthiophene, 2,5-dimethylthiophene, and 1-methylpyrrole. In one embodiment, the additive comprises from 2 to 15% by weight of the electrolyte solvent. In another embodiment, the additive comprises from 3 to 10% by weight of the electrolyte solvent.

The solvent mixture of the present invention comprising a dioxolane and one or more 1,2-dialkoxyalkanes of 5 or 6 carbon atoms and/or 1,3-dialkoxyalkanes of 5 or 6 carbons may further comprise additional electrolyte co-solvents including, but not limited to, nonaqueous organic solvents, such as, for example, N-methyl acetamide, acetonitrile, acetals, ketals, esters, carbonates, sulfones, sulfolanes, aliphatic ethers, cyclic ethers, polyethers, phosphate esters, siloxanes, N-alkylpyrrolidones, substituted forms of the foregoing, and blends thereof. Examples of polyethers that may be used as electrolyte co-solvents include, but are not limited to, dimethoxyethane, diethoxyethane, diethylene glycol dimethyl ether, triethylene glycol dimethyl ether, and 1,2-dimethoxycyclohexane.

The electrolytes of the present invention comprise lithium salts that are added to the electrolyte to increase the ionic conductivity. The concentration of the one or more lithium salts in the electrolytes of the present invention may be from about 0.2 M to 2.0 M depending on several factors such as the exact composition of the electrolyte solvent mixture, solubility of the salts, the conductivity of the dissolved salts, the charge and discharge conditions of the cell, the temperature of operations, and other factors known in the art of lithium batteries. Examples of lithium salts for use in the present invention include, but are not limited to, one or more of the group consisting of LiSCN, LiBr, LiI, $LiSO_3CF_3$, $LiSO_3CH_3$, $LiB(Ph)_4$, $LiC(SO_2CF_3)_3$, and $LiN(SO_2CF_3)_2$. Preferred ionic electrolyte salts are LiBr, LiI, LiSCN, $LiSO_3CF_3$, and $LiN(SO_2CF_3)_2$.

It is unexpected that the electrolyte solvents of the present invention comprising mixtures of a dioxolane and one or more 1,2-dialkoxyalkanes of 5 or 6 carbon atoms and/or 1,3-dialkoxyalkanes of 5 or 6 carbon atoms provide enhanced cycle life in electrochemical cells comprising lithium anodes and sulfur-containing cathodes.

While not being bound by any theory, it is believed that the electrolytes of the present invention are surprisingly effective in forming solid electrolyte interphase (SEI) at the lithium anode surface that is resistant to undesirable reactions from components of the cathode or cathode discharge species. This reduction of undesirable reactions, such as for example, corrosion reactions increases the cycle life of the cell. It is generally believed that a SEI is formed on lithium in contact with most, if not all electrolytes. However, the SEI in many cases may not provide protection from these undesirable reactions. The electrolyte solvents of the present invention comprising a dioxolane and one or more 1,2-dialkoxyalkanes of 5 or 6 carbon atoms and/or 1,3-dialkoxyalkanes of 5 or 6 carbon atoms, appear to form a resistant SEI on lithium in presence of sulfur-containing cathode active materials or their discharge products.

The term "figure of merit," (FOM), as used herein, is calculated by dividing the accumulated discharge capacity to the end of cycle life in mAh by the theoretical capacity of lithium (3860 mAh/g of lithium) in the anode.

The cells of Examples 1-5 comprising as electrolyte solvents mixtures of dioxolane and EME at various mole ratios from 1:5 to 5:1 (although the invention is not limited to these ratios) show cycle life and FOM greater than Comparative Examples 1-5 comprising as electrolyte solvents mixtures of dioxolane and DME at the same mole ratios, respectively. Where EME electrolytes are directly compared with the corresponding DME electrolytes (Examples 1-5 vs. Comparative Examples 1-5), the range of FOM increase is from 13% to over 600%. Examples 4 and 5, in which the electrolyte solvent has dioxolane content of 59% by weight and 78% by weight, respectively, have the highest FOM.

The electrolytes of the present invention enable Li/S cells to provide high cycle life with high sulfur utilization at practical discharge rates in the tests set forth in the Examples. The summary of results in Table 2 shows that in comparison with DME-based electrolytes, such as in the cells of Comparative Example 7, electrolytes having 1,2-dialkoxyalkanes of 5 or 6 carbon atoms exhibit much longer cycle lives. For example, the cells of Examples 8, 9, and 13 show increases in cycle life of from 40% to more than 80% compared with Comparative Example 7.

Cells and Batteries

One aspect of the present invention pertains to an electrochemical cell which comprises; (a) an anode comprising lithium; (b) a cathode comprising an electroactive sulfur-containing material; and (c) a liquid nonaqueous electrolyte, wherein the electrolyte comprises: (i) one or more lithium salts; and (ii) a solvent mixture comprising 10 to 90% by weight of a dioxolane and 10 to 90% by weight of one or more 1,2-dialkoxyalkanes of 5 or 6 carbon atoms and/or 1,3-dialkoxyalkanes of 5 or 6 carbons.

The anodes, cathodes, and electrolytes of the present invention may be assembled into cells or batteries by any of the methods known to those skilled in the art, such as, for example, winding or stacking. Cells or batteries of the present invention may be made in a variety of sizes and configurations that are known to those skilled in the art. These battery design configurations include, but are not limited to, planar, prismatic, jelly roll, w-fold, stacked and the like. Although the methods of the present invention are particularly suitable for use with thin film electrodes, they may nevertheless be beneficial in thick film designs. Alternatively, designs incorporating both low and high surface area regions, as described in U.S. Pat. Nos. 5,935,724 and 5,935,728 to Spillman et al., can be incorporated into jellyroll and other configurations.

Thin film electrodes may be configured into prismatic designs. With the drive to conserve weight, thin film barrier materials are particularly preferred, e.g. foils, etc. For example, in U.S. Pat. No. 6,190,426 to Thibault et al., the disclosure of which is incorporated herein by reference, methods for preparing prismatic cells in which suitable barrier materials for sealed casing, methods of filling cells with electrolyte, and methods of sealing the casing are described. When using thin film electrodes configured into prismatic designs it is important that the electrodes possess dimensional stability.

Batteries may be of any size or shape and may comprise one or more cells according to the invention. For example, one or more of the prismatic cells described in U.S. Pat. No. 6,190,426 to Thibault et al. may be connected to form a battery. Batteries comprising one or more cells may be encased in a rigid casing, for example, as described in U.S. Pat. No. 6,296,967 to Jacobs et al.

Although the electric current producing cell of the present invention may be utilized for a wide variety of primary batteries and a wide variety of secondary batteries, it is preferred to utilize these cells in secondary (or rechargeable) batteries.

EXAMPLES

Several embodiments of the present invention are described in the following examples, which are offered by way of illustration and not by way of limitation.

Comparative Example 1

A cathode was prepared by coating a mixture of 75 parts of elemental sulfur, 15 parts of a conductive carbon pigment, and 10 parts of PYROGRAF-III carbon filaments dispersed in isopropanol onto a 17 micron thick conductive carbon coated aluminum foil substrate. After drying, the coated cathode active layer thickness was about 25 microns and the loading of sulfur in the cathode active layer was 1.2 mg/cm$^2$. The anode was lithium foil of about 50 microns in thickness. The electrolyte was a solution of lithium bis(trifluoromethylsulfonyl)imide (lithium imide) in a mixture of 1,3-dioxolane and 1,2-dimethoxyethane (DME), in the mole ratios of lithium imide: dioxolane: DME of 1:1:5. The porous separator used was a 16 micron polyolefin separator.

The above components were combined into a layered structure of cathode/separator/anode, which was wound and compressed into a so-called jellyroll, with the liquid electrolyte (1.6 mL) filling the void areas of the separator and cathode to form prismatic cells with an electrode area of about 420 cm$^2$. After sealing the cells in a foil pouch, they were stored for 24 hours and then re-sealed, before discharge-charge cycling on these cells was performed at 175 mA/100 mA, respectively, with discharge cutoff at a voltage of 1.25 V and charge cutoff at 120% of the capacity of the last half cycle. The discharge capacity at the 5$^{th}$ cycle was 508 mAh. 30 discharge-charge cycles were obtained to the discharge capacity cut off of 300 mAh. The figure of merit (FOM) at the discharge capacity cut off was 6.5.

Example 1

Cells were made by the method of Comparative Example 1, except that the electrolyte was a solution of lithium imide in a mixture of 1,3-dioxolane and 1-ethoxy-2-methoxyethane (EME), in the mole ratios of lithium imide: dioxolane: EME of 1:1:5. Discharge-charge cycling on these cells was performed by the method of Comparative Example 1. The discharge capacity at the 5th cycle was 515 mAh. 48 discharge-charge cycles were obtained to the discharge capacity cut off of 300 mAh. The FOM at the discharge capacity cut off was 10.2. This FOM is 57% greater than that of Comparative Example 1.

Comparative Example 2

Cells were made by the method of Comparative Example 1, except that the electrolyte was a solution of lithium imide in a mixture of 1,3-dioxolane and DME, in the mole ratios of lithium imide: dioxolane: DME of 1:2:4. Discharge-charge cycling on these cells was performed by the method of Comparative Example 1. The discharge capacity at the 5$^{th}$ cycle was 505 mAh. 59 discharge-charge cycles were obtained to the discharge capacity cut off of 300 mAh. The FOM at the discharge capacity cut off was 12.7.

Example 2

Cells were made by the method of Comparative Example 1, except that the electrolyte was a solution of lithium imide in a mixture of 1,3-dioxolane and EME, in the mole ratios of lithium imide: dioxane: EME of 1:2:4. Discharge-charge cycling on these cells was performed by the method of Comparative Example 1. The discharge capacity at the 5$^{th}$ cycle was 512 mAh. 67 discharge-charge cycles were obtained to the discharge capacity cut off of 300 mAh. The FOM at the discharge capacity cut off was 14.4. This FOM is 13% greater than that of Comparative Example 2.

Comparative Example 3

Cells were made by the method of Comparative Example 1, except that the electrolyte was a solution of lithium imide in a mixture of 1,3-dioxolane and DME, in the mole ratios of lithium imide: dioxane: DME of 1:3:3. Discharge-charge cycling on these cells was performed by the method of Comparative Example 1. The discharge capacity at the 5$^{th}$ cycle was 523 mAh. 32 discharge-charge cycles were obtained to the discharge capacity cut off of 300 mAh. The FOM at the discharge capacity cut off was 6.5.

Example 3

Cells were made by the method of Comparative Example 1, except that the electrolyte was a solution of lithium imide in a mixture of 1,3-dioxolane and EME, in the mole ratios of lithium imide: dioxane: EME of 1:3:3. Discharge-charge cycling on these cells was performed by the method of Comparative Example 1. The discharge capacity at the 5$^{th}$ cycle was 582 mAh. 59 discharge-charge cycles were obtained to the discharge capacity cut off of 300 mAh. The FOM at the discharge capacity cut off was 13.2. This FOM is 103% greater than that of Comparative Example 3.

Comparative Example 4

Cells were made by the method of Comparative Example 1, except that the electrolyte was a solution of lithium imide in a mixture of 1,3-dioxolane and DME, in the mole ratios of lithium imide: dioxane: DME of 1:4:2. Discharge-charge cycling on these cells was performed by the method of Comparative Example 1. The discharge capacity at the 5$^{th}$ cycle was 541 mAh. 53 discharge-charge cycles were obtained to the discharge capacity cut off of 300 mAh. The FOM at the discharge capacity cut off was 11.2.

Example 4

Cells were made by the method of Comparative Example 1, except that the electrolyte was a solution of lithium imide in a mixture of 1,3-dioxolane and EME, in the mole ratios of lithium imide: dioxane: EME of 1:4:2. Discharge-charge cycling on these cells was performed by the method of Comparative Example 1. The discharge capacity at the 5$^{th}$ cycle was 550 mAh. 80 discharge-charge cycles were obtained to the discharge capacity cut off of 300 mAh. The FOM at the discharge capacity cut off was 17.0. This FOM is 52% greater than that of Comparative Example 4.

Comparative Example 5

Cells were made by the method of Comparative Example 1, except that the electrolyte was a solution of lithium imide in a mixture of 1,3-dioxolane and DME, in the mole ratios of lithium imide: dioxane: DME of 1:5:1. Discharge-charge cycling on these cells was performed by the method of Comparative Example 1. The discharge capacity at the 5$^{th}$ cycle was 419 mAh. 12 discharge-charge cycles were obtained to the discharge capacity cut off of 300 mAh. The FOM at the discharge capacity cut off was 2.5.

Example 5

Cells were made by the method of Comparative Example 1, except that the electrolyte was a solution of lithium imide in a mixture of 1,3-dioxolane and EME, in the mole ratios of lithium imide: dioxane: EME of 1:5:1. Discharge-charge cycling on these cells was performed by the method of Comparative Example 1. The discharge capacity at the 5$^{th}$ cycle was 516 mAh. 90 discharge-charge cycles were obtained to the discharge capacity cut off of 300 mAh. The FOM at the discharge capacity cut off was 18.4. This FOM is 635% greater than that of Comparative Example 5.

Table 1 summarizes calculations of the weight percentages of the DOL/EME mixtures vs. mole ratios for the Examples 1-5.

TABLE 1

| Weight % vs. Mole ratios of DOL/EME | | | | |
|---|---|---|---|---|
| Example | Mole DOL | Mole EME | % DOL by wt. | % EME by wt. |
| Example 1 | 1 | 5 | 12.5% | 87.5% |
| Example 2 | 2 | 4 | 26% | 74% |
| Example 3 | 3 | 3 | 41.6% | 58.4% |
| Example 4 | 4 | 2 | 59% | 41% |
| Example 5 | 5 | 1 | 78% | 22% |

Example 6

A method for preparing an electrochemical cell. The cathodes were prepared by coating a mixture of 60 parts by weight of elemental sulfur, 17.5 parts by weight of conductive carbon, 17.5 parts by weight of graphite, and 5 parts by weight of a polyethylene powder, dispersed in isopropanol, onto a 6 micron thick conductive carbon coated aluminum/polyester (PET) film substrate. After drying, the coated cathode active layer thickness was about 28-29 microns. The anode was lithium foil of about 50 microns in thickness. The porous separator used was a 9 micron polyolefin separator. The above components were assembled in a layered structure of cathode/separator/anode, which was wound and compressed, and placed in a foil pouch with liquid electrolyte (approximately 4.7 g). The prismatic cell had an electrode area of about 846 cm$^2$. The sulfur content of the cell was 1.13 g, equivalent to 1884 mAh capacity (1675 mAh/g×1.13 g). After sealing the cell in a foil pouch, it was stored for 24 hours and then re-sealed. Discharge-charge cycling of the cell was performed at 350 mA/200 mA, respectively, with discharge cutoff at a voltage of 1.8 V and charge cutoff at 2.5 V. The discharge rate of 350 mA is 0.414 mA/cm$^2$ for this cell (350 mA/846 cm$^2$) and the charge rate of 200 mA is 0.236 mA/cm$^2$ (200 mA/846 cm$^2$). The pause after each charge and discharge step was 2 minutes, unless otherwise noted. The temperature for the cell evaluation was between 22° C. and 25° C. The following Examples and Comparative Examples describe the electrolytes evaluated in these Li/S cells.

Comparative Example 6

Cells of Example 6 were assembled with a solution of lithium imide (32 g; 0.11 mole) in a solvent mixture of 1,3-dioxolane (34.6 ml) and DME (30.4 ml) as electrolyte. (The solvent mixture is 58.2% by weight 1,3-dioxolane and 41.8% by weight DME.) The average discharge capacity of 5 cells at the $5^{th}$ cycle was 856 mAh and specific capacity 760 mAh/g, a sulfur utilization of 45.4%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 36.3%) was 167 cycles.

Comparative Example 7

Cells of Example 6 were assembled with a solution of lithium imide (32 g; 0.11 mole) in a solvent mixture of 1,3-dioxolane (34.6 ml), DME (30.4 ml), and 2-methylfuran (6.0 ml) as electrolyte. (The solvent mixture is 53.5% by weight 1,3-dioxolane, 38.5% by weight DME, and 8.0% by weight 2-methylfuran.) The average discharge capacity of 4 cells at the $5^{th}$ cycle was 847 mAh and the specific capacity 753 mAh/g, a sulfur utilization 44.9%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 35.9%) was 204 cycles.

Example 7

Cells were prepared and discharge-charge cycling was performed as described in Example 6 except that the cathode was formed by coating a mixture of 65 parts by weight of elemental sulfur, 15 parts by weight of conductive carbon, 15 parts by weight of graphite, and 5 parts by weight of a polyethylene powder, dispersed in isopropanol. The sulfur content of the cell was 0.81 g, equivalent to 1360 mAh capacity (1675 mAh/g×0.81 g). The cells were assembled with a solution of lithium imide (32 g; 0.11 mole) in a solvent mixture of 1,3-dioxolane (34.6 ml) and EME (30.4 ml) as electrolyte. (The solvent mixture is 58.7% by weight 1,3-dioxolane and 41.3% by weight EME.) The average discharge capacity of 5 cells at the $5^{th}$ cycle was 675 mAh and specific capacity 83 1 mAh/g, a sulfur utilization of 49.6%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 39.7%) was 248 cycles.

Example 8

Cells were prepared and discharge-charge cycling was performed as described in Example 6 except that the cathode was formed by coating a mixture of 65 parts by weight of elemental sulfur, 15 parts by weight of conductive carbon, 15 parts by weight of graphite, and 5 parts by weight of a polyethylene powder, dispersed in isopropanol. The sulfur content of the cell was 1.07 g, equivalent to 1787 mAh capacity (1675 mAh/g×1.07 g). The cells were assembled with a solution of lithium imide (32 g; 0.11 mole) in a solvent mixture of 1,3-dioxolane (34.6 ml), EME (30.4 ml), and 2-methylfuran (6.0 ml) as electrolyte. (The solvent mixture is 54.0% by weight 1,3-dioxolane, 38.0% by weight EME, and 8.0% by weight 2-methylfuran.) The average discharge capacity of 5 cells at the $5^{th}$ cycle was 806 mAh and specific capacity 755 mAh/g, a sulfur utilization of 45.1%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 36.1%) was 292 cycles.

Example 9

Cells of Example 6 were assembled with a solution of lithium imide (32 g; 0.11 mole) in a solvent mixture of 1,3-dioxolane (34.6 ml), EME (30.4 ml), and 2-methylfuran (6.0 ml) as electrolyte. (The solvent mixture is 54.0% by weight 1,3-dioxolane, 38.0% by weight EME, and 8.0% by weight 2-methylfuran.) The average discharge capacity of 13 cells at the $5^{th}$ cycle was 812 mAh and specific capacity 761 mAh/g, a sulfur utilization of 45.4%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 36.3%) was 378 cycles.

Example 10

Cells of Example 6 were assembled with a solution of lithium imide (32 g; 0.11 mole) in a solvent mixture of 1,3-dioxolane (34.6 ml), 1,2-dimethoxypropane (1,2-DMP) (30.4 ml), and 2-methylfuran (6.0 ml) as electrolyte. (The solvent mixture is 53.8% by weight 1,3-dioxolane, 38.2% by weight 1,2-dimethoxypropane, and 8.0% by weight 2-methylfuran.) The average discharge capacity of 4 cells at the $5^{th}$ cycle was 856 mAh and specific capacity 761 mAh/g, a sulfur utilization of 45.4%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 36.3%)was 231 cycles.

Example 11

Cells of Example 6 were assembled with a solution of lithium imide (32 g; 0.11 mole) in a solvent mixture of 1,3-dioxolane (34.6 ml), 1,3-dimethoxypropane (1,3-DMP) (30.4 ml), and 2-methylfuran (6.0 ml) as electrolyte. (The solvent mixture is 54.0% by weight 1,3-dioxolane, 38.0% by weight 1,3-dimethoxypropane, and 8.0% by weight 2-methylfuran.) The average discharge capacity of 4 cells at the $5^{th}$ cycle was 860 mAh and specific capacity 765 mAh/g, a sulfur utilization of 45.7%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 36.6%) was 244 cycles.

Example 12

Cells of Example 6 were assembled with a solution of lithium imide (32 g; 0.11 mole) in a solvent mixture of 1,3-dioxolane (34.6 ml), 1,4-dimethoxybutane (30.4 ml), and 2-methylfuran (6.0 ml) as electrolyte. (The solvent mixture is 53.6% by weight 1,3-dioxolane, 38.4% by weight 1,4-dimethoxybutane, and 8.0% by weight 2-methylfuran.) The average discharge capacity of 2 cells at the $5^{th}$ cycle was 857 mAh and specific capacity 761 mAh/g, a sulfur utilization of 45.4%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 36.3%) was 178 cycles.

Example 13

Cells of Example 6 were assembled with a solution of lithium imide (24 g; 0.08 mole) and lithium triflate (4.4 g: 0.03 mole) in a solvent mixture of 1,3-dioxolane (31.1 ml), 4-methyl-1,3-dioxo (4.5 ml), EME (30.4 ml), and 2-methylfuran (6.1 ml) as electrolyte. (The solvent mixture is 48.0% by weight 1,3-dioxolane, 6.4% by weight 4-methyldioxolane, 37.6% by weight EME, and 8.0% by weight 2-methylfuran.) The average discharge capacity of 10 cells at the $5^{th}$ cycle was 789 mAh and specific capacity 749 mAh/g, a sulfur utilization of 44.7%. Discharge-charge cycling was continued until the discharge capacity reached 80% of the $5^{th}$ cycle ($Q_5$) discharge capacity. Cycle life to a discharge capacity of 80% of $Q_5$ (sulfur utilization 35.8%) was 331 cycles.

Table 2 summarizes the cycle life improvement in cells comprising electrolytes of the present invention.

TABLE 2

| Example | Glyme | 2-MF | Cycles to 80% $Q_5$ | Improvement over Comparative Ex. 7 |
|---|---|---|---|---|
| Comp. Example 6 | DME | No | 167 | NA |
| Example 7 | EME | No | 248 | NA |
| Comp. Example 7 | DME | Yes | 204 | — |
| Example 8 | EME | Yes | 292 | 89 cycles (43.8%) |
| Example 9 | EME | Yes | 378 | 175 cycles (86.2%) |
| Example 10 | 1,2-DMP | Yes | 231 | 28 cycles (13.8%) |
| Example 11 | 1,3-DMP | Yes | 244 | 41 cycles (20.2%) |
| Example 13 | EME | Yes | 331 | 128 cycles (63.0%) |

While the invention has been described in detail and with reference to specific embodiments thereof, it will be apparent to one skilled in the art that various changes and modifications can be made without departing from the spirit and scope of the invention. Hence, the invention is not limited to the embodiments disclosed herein but is instead set forth in the following claims and legal equivalents thereof.

The invention claimed is:

1. An electrochemical cell comprising:
   (a) an anode comprising lithium;
   (b) a cathode comprising an electroactive sulfur-containing material; and
   (c) a liquid nonaqueous electrolyte, wherein the electrolyte comprises:
      (i) one or more lithium salts; and
      (ii) a solvent mixture comprising 10 to 90% by weight of a dioxolane and 10 to 90% by weight of one or more of the group consisting of 1,2-dialkoxyalkanes of 5 or 6 carbon atoms and 1,3-dialkoxyalkanes of 5 or 6 carbon atoms.

2. The cell of claim 1 wherein the solvent mixture comprises 30 to 80% by weight of a dioxolane and 20 to 70% by weight of one or more of the group consisting of 1,2-dialkoxyalkanes of 5 or 6 carbon atoms and 1,3-dialkoxyalkanes of 5 or 6 carbon atoms.

3. The cell of claim 1 wherein the solvent mixture comprises 50 to 75% by weight of a dioxolane and 25 to 50% by weight of one or more of the group consisting of 1,2-dialkoxyalkanes of 5 or 6 carbon atoms and 1,3-dialkoxyalkanes of 5 or 6 carbon atoms.

4. The cell of claim 1 wherein the one or more of the group consisting of 1,2-dialkoxyalkanes of 5 or 6 carbon atoms and 1,3-dialkoxyalkanes of 5 or 6 carbon atoms are selected from one or more of the group consisting of 1-ethoxy-2-methoxyethane, 1-methoxy-2-propoxyethane, 1,2-dimethoxypropane, 1-ethoxy-2-methoxypropane, 2-ethoxy-1-methoxypropane, and 1,3-dimethoxypropane.

5. The cell of claim 4 wherein the one or more of the group consisting of 1,2-dialkoxyalkanes and 1,3-dialkoxyalkanes is 1-ethoxy-2-methoxyethane.

6. The cell of claim 1 wherein the dioxolane is selected from one or more of the group consisting of 1,3-dioxolane and 4-methyl-1,3-dioxolane.

7. The cell of claim 6 wherein the dioxolane is 1,3-dioxolane.

8. The cell of claim 1 wherein the electroactive sulfur-containing material comprises elemental sulfur.

9. The cell of claim 1 wherein the electrolyte solvent mixture further comprises an additive selected from one or more of the group consisting of furan, 2-methylfuran, 2,5-dimethylfuran, 2-methylthiophene, 2,5-dimethylthiophene, and 1-methylpyrrole.

10. The cell of claim 9 wherein the additive comprises from 2 to 15% by weight of the electrolyte solvent.

11. The cell of claim 9 wherein the additive comprises from 3 to 10% by weight of the electrolyte solvent.

12. The cell of claim 1 wherein the one or more lithium salts are selected from one or more of the group consisting of LiBr, LiI, $LiSO_3CF_3$, $LiN(SO_2CF_3)_2$, and $LiC(SO_2CF_3)_3$.

13. The cell of claim 1 wherein the anode comprises lithium metal.

14. A battery comprising a casing and one or more cells of claim 1.

15. An electrolyte of an electrochemical cell wherein the electrolyte comprises:
   (a) one or more lithium salts; and
   (b) a solvent mixture comprising 10 to 90% by weight of a dioxolane and 10 to 90% by weight of one or more of the group consisting of 1,2-dialkoxyalkanes of 5 or 6 carbon atoms and 1,3-dialkoxyalkanes of 5 or 6 carbon atoms.

16. The electrolyte of claim 15 wherein the solvent mixture comprises 50 to 75% by weight of a dioxolane and 25 to 50% by weight of one or more of the group consisting of 1,2-dialkoxyalkanes of 5 or 6 carbon atoms and 1,3-dialkoxyalkanes of 5 or 6 carbon atoms.

17. The electrolyte of claim 15 wherein the solvent mixture further comprises an additive selected from the group consisting of furan, 2-methylfuran, 2,5-dimethylfuran, 2-methylthiophene, 2,5-dimethylthiophene, and 1-methylpyrrole.

18. The electrolyte of claim 17 wherein the additive comprises from 3 to 10% by weight of the electrolyte solvent.

19. The electrolyte of claim 15 wherein the one or more lithium salts are selected from one or more of the group consisting of LiBr, LiI, $LiSO_3CF_3$, $LiN(SO_2CF_3)_2$, and $LiC(SO_2CF_3)_3$.

20. The electrolyte of claim 15 wherein the electroactive sulfur-containing material comprises elemental sulfur.

21. An electrochemical cell comprising:
   (a) a cathode comprising an electroactive sulfur-containing material;
   (b) an anode comprising lithium; and
   (c) a nonaqueous electrolyte, wherein the electrolyte comprises:
      (i) one or more lithium salts; and
      (ii) a solvent mixture comprising 10 to 90% by weight of a dioxolane and 10 to 90% by weight of one or more of the group consisting of 1,2-dialkoxyalkanes of 5 or 6 carbon atoms and 1,3-dialkoxyalkanes of 5 or 6 carbon atoms; and wherein the cell exhibits a utilization of the electroactive sulfur containing material of at least 35% over at least 200 cycles at a discharge rate of about 0.4 mA/cm$^2$.

22. The cell of claim 21 that exhibits a utilization of the electroactive sulfur containing material of at least 35% over at least 250 cycles at a discharge rate of about 0.4 mA/cm$^2$.

23. The cell of claim 21 wherein the solvent mixture comprises 50 to 75% by weight of a dioxolane and 25 to 50% by weight of one or more of the group consisting of 1,2-dialkoxyalkanes of 5 or 6 carbon atoms and 1,3-dialkoxyalkanes of 5 or 6 carbon atoms.

24. The cell of claim 21 wherein the one or more of the group consisting of 1,2-dialkoxyalkanes of 5 or 6 carbon atoms and 1,3-dialkoxyalkanes are selected from one or more of the group consisting of 1-ethoxy-2-methoxyethane, 1-methoxy-2-propoxyethane, 1,2-dimethoxypropane, 1-ethoxy-2-methoxypropane, 2-ethoxy-1-methoxypropane, and 1,3-dimethoxypropane.

25. The cell of claim 21 wherein the one or more of the group consisting of 1,2-dialkoxyalkanes of 5 or 6 carbon atoms and 1,3-dialkoxyalkanes is 1-ethoxy-2-methoxyethane.

26. The cell of claim 21 wherein the dioxolane is selected from one or more of the group consisting of 1,3-dioxolane and 4-methyl-1,3-dioxolane.

27. The cell of claim 21 wherein the solvent mixture further comprises an additive selected from one or more of the group consisting of furan, 2-methylfuran, 2,5-dimethylfuran, 2-methylthiophene, 2,5-dimethylthiophene, and 1-methylpyrrole.

28. The cell of claim 27 wherein the additive comprises from 3 to 10% by weight of the electrolyte solvent.

29. A battery comprising a casing and one or more cells of claim 21.

30. The cell of claim 21 wherein the electroactive sulfur-containing material comprises elemental sulfur.

* * * * *